United States Patent
Wang et al.

(10) Patent No.: US 12,253,935 B2
(45) Date of Patent: Mar. 18, 2025

(54) METHOD, DEVICE, AND COMPUTER PROGRAM PRODUCT FOR TESTING

(71) Applicant: Dell Products L.P., Round Rock, TX (US)

(72) Inventors: Nan Wang, Chengdu (CN); Chi Chen, Chengdu (CN); Yang Wu, Chengdu (CN); Jing Ye, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 174 days.

(21) Appl. No.: 18/115,914

(22) Filed: Mar. 1, 2023

(65) Prior Publication Data
US 2024/0273010 A1    Aug. 15, 2024

(30) Foreign Application Priority Data
Jan. 20, 2023   (CN) .......................... 202310102367.3

(51) Int. Cl.
*G06F 11/3668* (2025.01)

(52) U.S. Cl.
CPC ........ *G06F 11/368* (2013.01); *G06F 11/3676* (2013.01)

(58) Field of Classification Search
USPC ....................................................... 717/124
See application file for complete search history.

(56) References Cited

U.S. PATENT DOCUMENTS

| | | | | |
|---|---|---|---|---|
| 10,380,004 | B2* | 8/2019 | Liemandt | G06F 11/3672 |
| 10,768,893 | B2* | 9/2020 | Misra | G06F 11/3676 |
| 2009/0265693 | A1* | 10/2009 | Bakowski | G06F 11/3688 717/131 |
| 2017/0046245 | A1* | 2/2017 | Liu | G06F 11/368 |
| 2017/0270035 | A1* | 9/2017 | Nie | G06F 11/3688 |
| 2019/0129833 | A1* | 5/2019 | Lv | G06F 11/3664 |
| 2020/0310948 | A1* | 10/2020 | Culibrk | G06N 7/01 |

OTHER PUBLICATIONS

"Deduplicate Existing Test Cases"; Broadcom website (techdocs.broadcom.com) [full URL included in ref.]; May 2020 (Year: 2020).*

(Continued)

*Primary Examiner* — Qing Chen
*Assistant Examiner* — Clint Thatcher
(74) *Attorney, Agent, or Firm* — Ryan, Mason & Lewis, LLP

(57) ABSTRACT

Embodiments of the present disclosure relate to a method, an electronic device, and a computer program product for testing. The method includes: obtaining code modification information, program error information, and test case information. The method further includes: selecting a first test case set associated with code modification records from the test case information according to the program error information. The method further includes: sorting multiple test cases in the first test case set to generate a test strategy for the code modification records. Embodiments of the present disclosure may select the best test case for current code fix to meet different test requirements and reduce the test time.

20 Claims, 6 Drawing Sheets

(56) References Cited

OTHER PUBLICATIONS

"Should We Always Unit Test Bugs When Correcting Them?"; Software Engineering at Stackexchange.com website [full URL included in ref.]; May 2012 (Year: 2012).*
"What is Test Driven Development (TDD)?"; AgileAlliance.org website [full URL included in ref.]; Dec. 2015 (Year: 2015).*
F. Murtagh et al., "Methods of Hierarchical Clustering," arXiv:1105.0121v1, Apr. 30, 2011, 21 pages.
A. K. Singh et al., "Vectorization of Text Documents for Identifying Unifiable News Articles," International Journal of Advanced Computer Science and Applications, vol. 10, No. 7, Jul. 2019, pp. 305-310.
J. Lilleberg et al., "Support Vector Machines and Word2vec for Text Classification with Semantic Features," International Conference on Cognitive Informatics & Cognitive Computing, Jul. 6, 2015, pp. 136-140.
F. Murtagh et al., "Algorithms for Hierarchical Clustering: An Overview, II," Interdisciplinary Reviews: Data Mining and Knowledge Discovery, vol. 7, No. 6, Jul. 29, 2017, 28 pages.
F. Murtagh et al., "Algorithms for Hierarchical Clustering: An Overview," WIREs Data Mining and Knowledge Discovery, vol. 9, Jan./Feb. 2011, 12 pages.
U.S. Appl. No. 17/735,223 filed in the name of Nan Wang et al. on May 3, 2022, and entitled "Hierarchical Clustering of Test Cases for Use in Generating Testing Plans for Information Technology Assets."

\* cited by examiner

| Test case | f_1 |
| --- | --- |
| | EstimateTotalBytesToBeTransferred |
| QC-47829_Async_Replication | 1 |
| QC-488892_vvol_migration_Scale | |
| QC-43321_Multiple_deleting_volumes_clones | |
| QC-42255_Async_Replication_AG_Remap | |
| QC-49881_Async_Replication_snap_largconfig | |
| QC-42331_Replication_data_Fresh_install_appliance | |
| QC-51151_Snap_Diff_verification | |
| QC-533233_Replicate_VNX_PS | |
| QC-49881_Async_Replication_snap_basicConfig | |
| QC-48113_vol_migration_cutover | |
| QC-48111_vol_migration_basic | 1 |
| …… | |

FIG. 3C

| Test case | f_3 | f_6 |
| --- | --- | --- |
| | GetMidLevelBitmapDone | GenerateCurrentSGL |
| QC-47829_Async_Replication | 1 | |
| QC-488892_vvol_migration_Scale | | |
| QC-43321_Multiple_deleting_volumes_clones | 1 | |
| QC-42255_Async_Replication_AG_Remap | | 1 |
| QC-49881_Async_Replication_snap_largconfig | | 2 |
| QC-42331_Replication_data_Fresh_install_appliance | | 1 |
| QC-51151_Snap_Diff_verification | | 1 |
| QC-533233_Replicate_VNX_PS | | 1 |
| QC-49881_Async_Replication_snap_basicConfig | | |
| QC-48113_vol_migration_cutover | | |
| QC-48111_vol_migration_basic | | 1 |
| …… | | |

FIG. 3C (continued)

| Test case | f_10 SendBulkCopyCompletedMsg | f_27 ProcessIo | ... |
|---|---|---|---|
| QC-47829_Async_Replication | | | |
| QC-488892_vvol_migration_Scale | 2 | | |
| QC-43321_Multiple_deleting_volumes_clones | | | |
| QC-42255_Async_Replication_AG_Remap | | | |
| QC-49881_Async_Replication_snap_largconfig | | | |
| QC-42331_Replication_data_Fresh_install_appliance | | | |
| QC-51151_Snap_Diff_verification | | | |
| QC-533233_Replicate_VNX_PS | | | |
| QC-49881_Async_Replication_snap_basicConfig | 1 | | |
| QC-48113_vol_migration_cutover | | 1 | |
| QC-48111_vol_migration_basic | | | |
| ...... | | | |

FIG. 3C (continued)

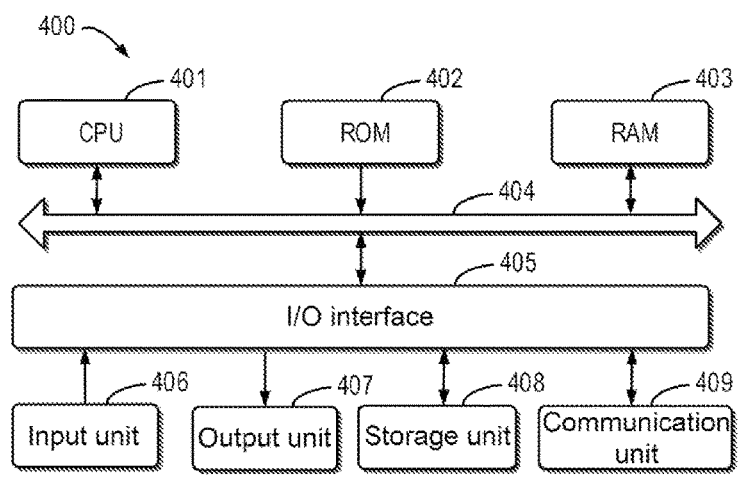

FIG. 4

METHOD, DEVICE, AND COMPUTER PROGRAM PRODUCT FOR TESTING

RELATED APPLICATION

The present application claims priority to Chinese Patent Application No. 202310102367.3, filed Jan. 20, 2023, and entitled "Method, Device, and Computer Program Product for Testing," which is incorporated by reference herein in its entirety.

FIELD

Embodiments of the present disclosure generally relate to the field of computers, and more particularly to a method, a device, and a computer program product for testing.

BACKGROUND

In the process of product development, the test of program code is a very important link, which may effectively ensure the correct operation of products. Test cases are a set of test inputs, execution conditions, and expected results written for a specific goal to verify whether a specific software requirement is met. At present, according to conventional technologies for implementing code testing, it is usually that testers develop designs manually. Furthermore, after testing, for test cases with exceptions, it is also necessary to manually check causes of these exceptions.

SUMMARY

Embodiments of the present disclosure provide a method for testing, a device, and a computer program product.

In a first aspect of the present disclosure, a method for testing is provided. The method comprises: obtaining code modification information, program error information, and test case information, the code modification information comprising code modification records performed for program errors in the program error information, and the test case information comprising test cases made for the program errors; selecting a first test case set associated with the code modification records from the test case information according to the program error information; and sorting multiple test cases in the first test case set to generate a test strategy for the code modification records.

In a second aspect of the present disclosure, an electronic device is provided. The electronic device comprises at least one processor and at least one memory storing computer program instructions, wherein the computer program instructions, when executed by the at least one processor, cause the electronic device to perform actions comprising: obtaining code modification information, program error information and test case information, the code modification information comprising code modification records performed for program errors in the program error information, and the test case information comprising test cases made for the program errors; selecting a first test case set associated with the code modification records from the test case information according to the program error information; and sorting multiple test cases in the first test case set to generate a test strategy for the code modification records.

In a third aspect of the present disclosure, a computer program product is provided. The computer program product is tangibly stored on a non-transitory computer-readable medium and comprises machine-executable instructions. The machine-executable instructions, when executed by a device, cause the device to execute any step of the method according to the first aspect of the present disclosure.

This Summary is provided to introduce the selection of concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent from description of example embodiments of the present disclosure, provided herein in further detail with reference to the accompanying drawings, and in the example embodiments of the present disclosure, the same reference numerals generally represent the same components.

FIG. 3C shows an example of a relationship matrix according to some embodiments of the present disclosure and is shown in three parts;

FIG. 4 shows a schematic block diagram of an example device that may be used for implementing embodiments of the present disclosure.

In the accompanying drawings, identical or corresponding numerals represent identical or corresponding parts.

DETAILED DESCRIPTION

Figure 1:
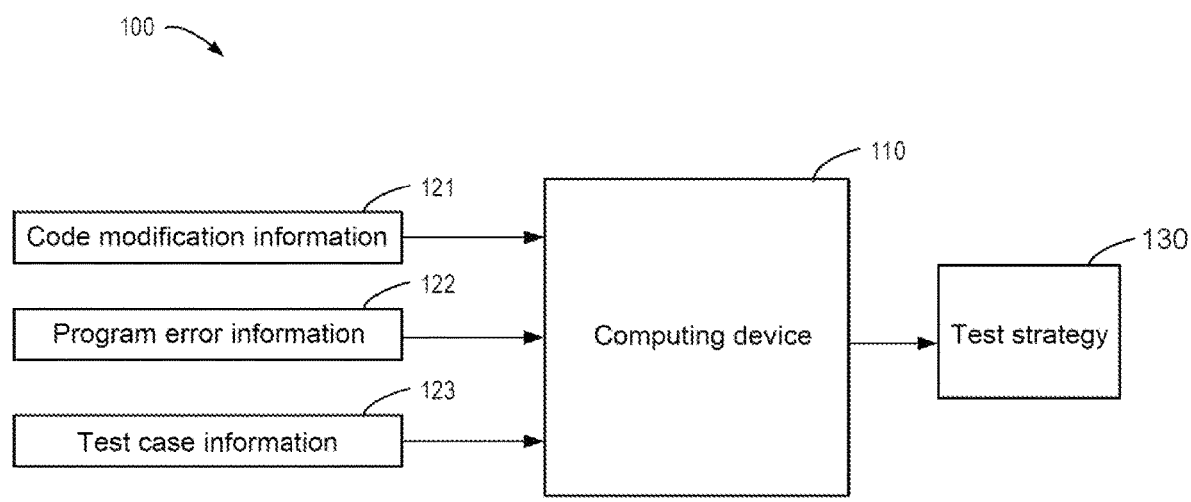
FIG. 1 shows a schematic diagram of an example environment in which some embodiments of the present disclosure may be implemented.

Illustrative embodiments of the present disclosure will be described in more detail below with reference to the accompanying drawings. Although illustrative embodiments of the present disclosure are illustrated in the accompanying drawings, it should be understood that the present disclosure may be implemented in various forms and should not be viewed as being limited by the embodiments illustrated herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "at least partially based on." The terms "an example embodiment" and "an embodiment" indicate "at least one example embodiment." The term "another embodiment" indicates" at least one additional embodiment." The terms "first," "second," and the like may refer to different or identical objects. Other explicit and implicit definitions may also be included below.

Code testing in conventional technologies often takes an excessively long time. How to achieve efficient code testing is still a technical problem to be solved urgently at present. In product development and testing, code modification, program error fix, new code addition, and the like may require regression testing to verify the updated code to ensure that no new problems are introduced. As a product becomes more complex, the number of test cases will surge. It is unrealistic to run all test cases for each code fix and update cycle because it is laborious and time consuming. In addition to the formal project cycle, there are also test requirements for emergency fixes, such as those that address customer problems. These test cases have different test requirements for execution time test coverage and hardware requirements. For example, customer emergency fixes can be very sensitive to test case running time.

A traditional test design has some problems in the selection of test cases. For example, traditional regression selection depends on the experience of testers. This may lead to unstable regression testing efficiency. In addition, this forward-looking test case selection method cannot help a test team make the most logical judgment, because testers cannot ensure that the selected test cases can seamlessly cover functional areas. In conventional technologies, although testers can select relevant test cases according to functional modifications made during iterations, this method focuses more on the modifications per se. Testers may select some "never failed" test cases. Such test cases take up test time and cannot "prove" their effectiveness, and may even make more "inconspicuous" problems not be correctly checked. Some potential relationships between certain test cases and current code fixes are not obvious, which cannot be easily understood by testers and even test case designers. Some existing methods for recording relationships between code and test cases increase the burden of developing and testing product code and take more time to run all test cases, and most of the relationships may not be useful during a specified code fix.

Therefore, embodiments of the present disclosure provide a solution for testing to solve one or more of the above problems and other potential problems. In the solution, a test case set associated with code modification records in code modification information is selected from test case information according to program errors in program error information, and multiple test cases in the test case set are sorted to generate a test strategy for the code modification records. The test strategy may select the best test case for current code fix to meet different test requirements and reduce the test time.

Illustrative embodiments of the present disclosure will be described in detail below with reference to the accompanying drawings.

FIG. 1 shows a schematic diagram of environment 100 in which a plurality of embodiments of the present disclosure may be implemented. Example environment 100 includes computing device 110.

Computing device 110 illustratively uses code modification information 121, program error information 122, and test case information 123, which may be obtained and/or input from one or more other devices, to generate/output functions of a test strategy 130. Example computing device 110 includes, but is not limited to, a personal computer, a server computer (also referred to as simply a "server"), a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, and the like. The server may be a cloud server, also referred to as a cloud computing server or a cloud host, and is a host product in a cloud computing service system, for solving the defects of high management difficulty and weak business scalability in conventional physical hosts and Virtual Private Server (VPS for short) services. The server may also be a server of a distributed system or a server combined with a block chain.

Program error information 122 includes any information related to abnormal functions, crash, data loss, abnormal interruption, and other phenomena caused by errors of programs during software running. If a program error (also called "Bug") is found during product running, program code needs to be modified to fix the Bug. Code modification information 121 herein includes any information for modifying program code. For example, testers may fix a Bug by modifying multiple functions in program code. Testers may also fix multiple Bugs by modifying one function in program code. In addition, testers may further fix multiple Bugs by modifying multiple functions in program code. It should be understood that Bugs in multiple Bugs may be duplications of other Bugs in multiple Bugs, or may be duplications of other Bugs other than the multiple Bugs.

Test case information 123 includes the information of test cases (also called test scripts) corresponding to Bugs. Test cases herein generally include case titles, preconditions, test steps, and expected results. The case title mainly describes the test of a function. The precondition means that the case title needs to meet this condition. The test steps mainly describe the operation steps of use cases. The expected results refer to requirements that meet expectations (development specifications, requirement documents, user requirements, and the like). The test strategy herein involves the selection of test cases for implementing efficient Bug fix during product testing.

Figure 2:
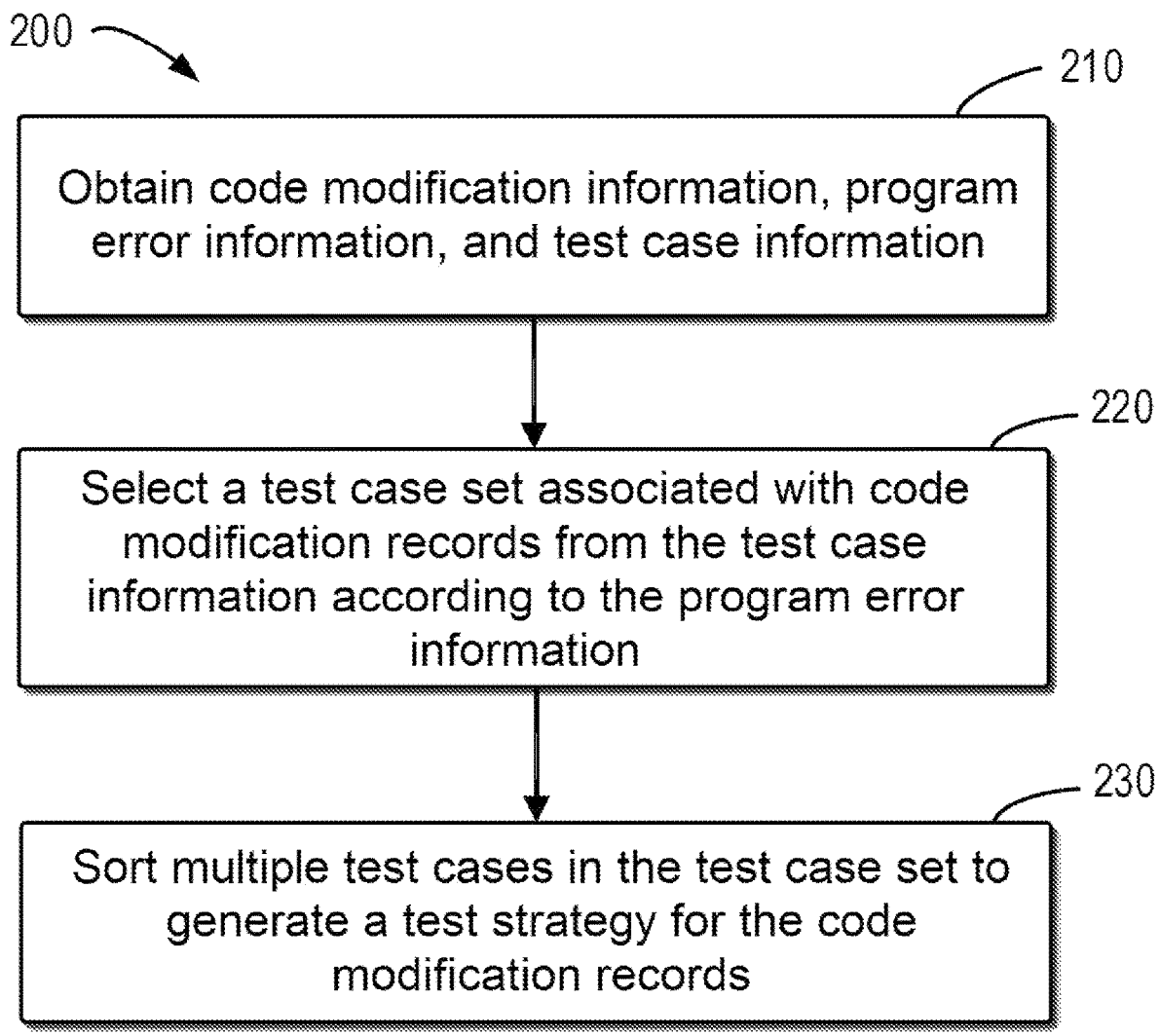
FIG. 2 shows a flow chart of an example method for testing according to some embodiments of the present disclosure.

FIG. 2 shows a flow chart of example method 200 for testing according to some embodiments of the present disclosure. Method 200 may be performed in example environment 100 as shown in FIG. 1. For example, method 200 may be performed by computing device 110 as shown in FIG. 1. It should be understood that method 200 may also be performed by other appropriate devices or apparatuses. Method 200 may include additional actions not shown and/or may omit actions shown, and the scope of the present disclosure is not limited in this regard. Method 200 will be described in detail below with reference to FIG. 1.

As shown in FIG. 2, in block 210, code modification information, program error information, and test case information are obtained. For example, code modification information 121 includes code modification records performed for program errors in program error information 122. Test case information 123 includes test cases written for program errors.

Figure 3A:
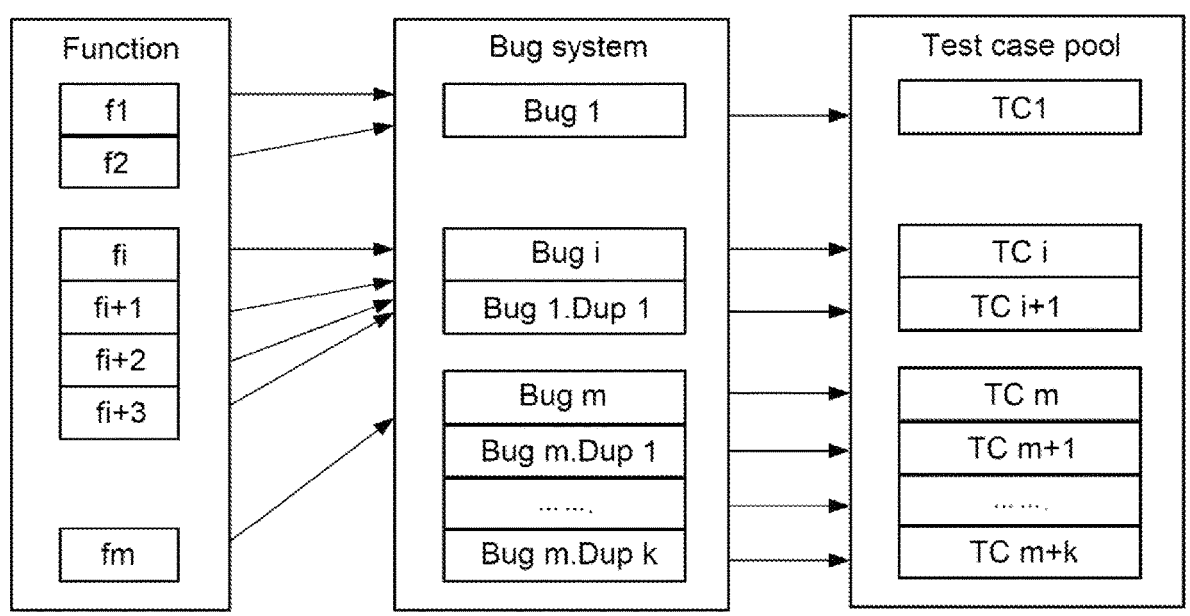
FIG. 3A shows an example of mapping relationships among code modification information, program error information, and test case information according to some embodiments of the present disclosure.

As described above, code modification information 121 has mapping relationships with program error information 122, and the mapping relationships include multiple-to-one mapping, multiple-to-multiple mapping, and one-to-multiple mapping. For example, as shown in FIG. 3A, function 1 (f1) and function 2 (f2) in the records of functions modified for Bugs may be mapped to Bug 1 in a Bug system. Function i (fi), function i+1 (fi+1), function i+2 (fi+2), and function i+3 (fi+3) in the records may be mapped to Bug i and duplication 1 (Bug 1.Dup1) of Bug 1 in the Bug system. Function m (fm) in the records may be mapped to Bug m and duplication 1 (Bug m.Dup1) of Bug m to duplication k (Bug m.Dup k) of Bug m in the Bug system. Here, program error information 122 and test case information 123 may have a one-to-one mapping relationship. Specifically, as shown in FIG. 3A, for example, Bug 1 in the Bug system may be mapped to test case 1 (TC1) in a test case pool, Bug m.Dup1 in the Bug system may be mapped to test case m+1 (TC m+1) in the test case pool, and the like.

In block 220, a test case set associated with code modification records is selected from the test case information according to the program error information. In some embodiments, block 220 may be implemented in the following manner. First, a test case set having mapping relationships with code modification records is determined from the test case information according to the above-mentioned mapping relationships between code modification records and program errors and mapping relationships between program errors and test cases. Then, the test cases in the test case set are de-duplicated to obtain the test case set mentioned in block 220. In some embodiments, the code modification records include function-level code modification records, and the test case set in block 220 includes function-level test cases having mapping relationships with the function-level code modification records. The following will be described with reference to specific examples.

In an example, computing device 110 may obtain Bug set D, test case set T, and updated code function set BF$f$ tracked in the Bug recording system. Here, test case set T may include test cases 1 to n, which may be represented by mathematical equation $T=\{t_1, t_2 \ldots t_n\}$. Updated code function set BF$f$ may be represented by mathematical equation BF$f=\{f_1, f_2 \ldots f_m\}$(BF$f \in C$), wherein C represents a set of all code. Bug set D may update function $f_j(f_j \in BF)$ in updated code function set BF$f$, and may be mathematically represented by $d(f_j)$. The $d(f_j)$ includes several sets of parent and child Bugs associated with function $f_j$ in updated code function set BF$f$, which specifically may be represented by mathematical equation $d(f_j)=\{d_{1j}, d_{2j} \ldots d_{xj}\}$. With reference to the mapping relationships between Bugs in Bug set D and test cases in the test case set, the test case set associated with function $f_j$ in updated code function set BF$f$ may be further mathematical equation $t(d(f_j))=\{tcd_{1j}, tcd_{2j} \ldots tcd_{xj}\}(t(d(f_j)) \in T$. If the same test case reports two Bugs that have the same code fix (for example, $d_{ij}$ and $d_{xj}$ that belongs to a parent-child relationship), test cases $tcd_{ij}$ and $tcd_{xj}$ corresponding to the two Bugs respectively may be de-duplicated. For example, updated set $\{tcd_{ij}\}$ may be obtained by de-duplicating $\{tcd_{ij}, tcd_{xj}\}$. If the code fixes corresponding to the two Bugs respectively are different, test cases $\{tcd_{ij}$ and $tcd_{xj}\}$ are determined as the test case in the test case set mentioned in block 220.

Based on the mapping relationships between function $f_j$ in updated code function set BF$f$ and $d(f_j)$ in Bug set D and mapping relationships between $d(f_j)$ and in Bug set D and test case $t_n$ in test set T, the following mapping relationship table between function $f_j$ in updated code function function set BF$f$ and test case ty in test case set T may be obtained:

|       | $f_1$ | ... | $f_m$ |
|-------|-------|-----|-------|
| $t_1$ | 4     | ... | 0     |
| ...   | ...   | ... | ...   |
| $t_x$ | 0     | ... | 1     |

The mapping relationship table may also be represented by following mathematical equation (1):

$$ccM = [\delta_{ij}] = \begin{bmatrix} 4 & \ldots & 0 \\ \vdots & \ddots & \vdots \\ 0 & \ldots & 1 \end{bmatrix} \text{map} \quad \text{equation (1)}$$

wherein relationship matrix ccM is a m×n matrix, and the number of associated Bugs which are reported by test case $t_i$ and fixed at least by using $f_j$ may be represented by equation $\delta_{ij}=|d_{ij}|$ or $\delta_{ij}=0$. map refers to the mapping relationships in the mapping relationship table. For example, the number of associated Bugs which are reported by $t_1$ and may be modified in $f_1$ to be fixed may be 4.

According to the Pareto principle, 80% of Bugs are mainly associated with 20% of code, so the mapping relationship table is not particularly large, and the mapping relationship table may only be used for recording instead of computing.

In some other embodiments, the code modification records further include file-level code modification records, and the test case set in block 220 further includes file-level test cases having mapping relationships with the file-level code modification records. In some other embodiments, the code modification records further include module-level code modification records, and the test case set in block 220 further includes module-level test cases having mapping relationships with the module-level code modification records. For example, according to the records of the foregoing mapping relationship table, it may be found that one code function may correspond to multiple test cases, while some other code functions may not be mapped to any test case. Therefore, illustrative embodiments apply different levels of attention or conduct different treatment for different test cases. For example, if the code function is mapped to zero test cases or the number of the mapped test cases may not meet test requirements, the same mapping relationship may be applied to the corresponding code file or module including the code function. The updated code function set may be extended to a code file tracked in the Bug recording system: BFF=$\{F_i, F_2 \ldots F_m\}$(BFF$\in$C) ($f_j \in F_j$). Alternatively, the updated code function set may also be extended to a code module tracked in the Bug recording system: BFM=$\{M_1, M_2 \ldots M_m\}$(BFM–C) ($F_j \in M_j$).

Therefore, in some embodiments, a test case set associated with code fix may be composed of three different priority pools:

| P1 | P2 | P3 |
|----|----|----|
| $t(d(f_j))$ | $t(d(F_j)) - t(d(F_j)) \cap t(d(f_j))$ | $t(d(M_j)) - t(d(M_j)) \cap t(d(F_j)) \cap t(d(f_j))$ | wherein the test case set corresponding to the function-level code modification records has the highest priority P1, followed by the test case set (P2) corresponding to the file-level code modification records and the test case set (P3) corresponding to the module-level code modification records.

Each priority pool may include multiple test cases. Method 200 may sort the priorities of multiple test cases in each priority pool to select the most efficient test case under some external constraints (such as test time constraints and human resource constraints). A specific selecting manner may be implemented in block 230. It should be understood that embodiments of the present disclosure may not need to perform the step in block 230 for each priority pool. For example, when the test time is relatively limited, only the test cases in priority P1 pool may be sorted to select the best one or more test cases.

In block 230, multiple test cases in the test case set mentioned in block 220 are sorted to generate a test strategy for the code modification records. Herein, the manner of sorting multiple test cases in the test case set in block 220 may be determined according to actual needs. For illustrative description only, the following describes the sorting of the multiple test cases in terms of priority. In some embodiments, multiple test cases in the test case set mentioned in block 220 may be sorted in the following manner.

First, for each test case in the test case set in block 220, a hit rate score, a program error priority score and a test time score are calculated respectively.

Herein, the hit rate score for each test case in the test case set in block 220 may be obtained according to following equation (2):

$$r_i^{f_j} = \frac{\delta_{ij}}{\sum_{i=1}^{x} \delta_{ij}} \quad \text{equation (2)}$$

wherein $r_i^{f_j}$ (which may be called a regression factor) represents a proportion of the number of associated program errors corresponding to the current test case to the total number of associated program errors corresponding to all test cases in the test case set in block 220, and $\delta_{ij}$ represents the number of associated program errors fixed according to the corresponding code modification records for the current test case (referring to the foregoing relationship matrix).

The program error priority score for each test case in the test case set in block 220 may be obtained according to following equation (3) and equation (4):

$$ps(d_{ij}) = \begin{cases} 4 (\text{if } p(d_{ij}) = p00) \\ 2 (\text{if } p(d_{ij}) = p01) \\ 1 (\text{if } p(d_{ij}) = p02) \end{cases} \quad \text{equation (3)}$$

wherein $ps(d_{ij})$ represents the priority value of the associated program error corresponding to the current test case for code modification record $f_i$. For example, if the priority of the associated program error $d_{ij}$ is P00, the corresponding priority value is 4.

$$P_i^{f_j} = \frac{ps(t_i)}{\sum_{i=1}^{x} ps(t_i)} \quad \text{equation (4)}$$

wherein $P_i^{f_j}$ represents a ratio of the priority values $ps(t_i)$ of the associated program errors corresponding to the current test case to the sum $\sum_{i=1}^{x} ps(t_i)$ of the priority values of the associated program errors corresponding to all test cases in the test case set in block 220.

The test time score for each test case in the test case set in block 220 may be obtained according to equation (5):

$$T_i^{f_j} = \frac{\max\{T(t_1) \ldots \ldots \ldots T(t_x)\}}{T(t_i)} * 0.1 \quad \text{equation (5)}$$

wherein $T(t_i)$ represents an execution time duration for the current test case. The test time score of the current test case corresponding to the code modification record $f_i$ may be obtained based on a ratio of a reference time duration to the execution time duration of the current test case. The reference time duration may be a maximum execution time duration selected from all execution time durations corresponding to each test case in the test case set in block 220.

Then, a total score for indicating the priority of each test case in the test case set in block 220 is obtained based on the hit rate score, the program error priority score, and the test time score. For example, the total score $SC(t_i)$ for the priority of the current test case may be represented by equation (6):

$$SC(t_i)(t_i \in t(d(f_i))) = \omega_1 * r_i^{f_j} + \omega_2 * p_i^{f_j} + \omega_3 * T_i^{f_j} = \quad \text{equation (6)}$$
$$\omega_1 * \frac{\delta_{ij}}{\sum_{i=1}^{x} \delta_{ij}} + \omega_2 * \frac{ps(t_i)}{\sum_{i=1}^{x} ps(t_i)} +$$
$$\omega_3 * \frac{\max\{T(t_1) \ldots T(t_x)\}}{T(t_i)} * 0.1$$

wherein $\omega_1$, $\omega_2$ and $\omega_3$ respectively represent weights applied to the hit rate score, the program error priority score, and the test time score.

In some embodiments, in order to consider the possible test coverage of the current test case for other features of the product, or in a case that the sorted priorities implemented based on equation (6) cannot meet requirements, the test cases in the test case set in block 220 may also be obtained based on hit rate scores, program error priority scores, test time scores, and feature-level program error distribution scores.

Herein, the feature-level program error distribution score $C_i^{f_j}$ for the current test case and code modification record $f_i$ may be obtained according to equation (7):

$$C_i^{f_j} = \quad \text{equation (7)}$$
$$\frac{B(t_i)}{\max\{B(t_1) \ldots \ldots \ldots B(t_x)\}} + \frac{D(t_i)}{\max\{D(t_1) \ldots \ldots \ldots D(t_x)\}}$$

wherein $$\frac{B(t_i)}{\max\{B(t_1) \ldots \ldots \ldots B(t_x)\}}$$

represents a ratio of the number of program errors mapped to the current test case across features to the number of reference program errors, and $$\frac{D(t_i)}{\max\{D(t_1) \ldots \ldots \ldots D(t_x)\}}$$

represents a ratio of the number of features mapped to the current test case across features to the number of reference features.

$$\frac{B(t_i)}{\max\{B(t_1) \ldots \ldots \ldots B(t_x)\}} \text{ and } \frac{D(t_i)}{\max\{D(t_1) \ldots \ldots \ldots D(t_x)\}}$$

may be used together for representing the possible test coverage of the current test case for other features of the product. The number of reference program errors may be a maximum value selected from a set of the numbers of program errors mapped to each test case across features. The number of reference features may be a maximum value selected from a set of the numbers of features mapped to each test case across features.

In this embodiment, the total score $SC(t_i)$ for the priority of the current test case may be represented by equation (8):

$$SC(t_i)(t_i \in t(d(f_j))) =$$
$$\omega_1 * r_i^{f_j} + \omega_2 * p_i^{f_j} + \omega_3 * T_i^{f_j} + \omega_4 * C_i^{f_j} = \omega_1 * \frac{\delta_{ij}}{\sum_{i=1}^{x} \delta_{ij}} +$$
$$\omega_2 * \frac{ps(t_i)}{\sum_{i=1}^{x} ps(t_i)} + \omega_3 * \frac{\max\{T(t_1) \ldots T(t_x)\}}{T(t_i)} * 0.1 +$$
$$\omega_4 * \left( \frac{B(t_i)}{\max\{B(t_1) \ldots B(t_x)\}} + \frac{D(t_i)}{\max\{D(t_1) \ldots D(t_x)\}} \right)$$

wherein $\omega_1$, $\omega_2$, $\omega_3$, and $\omega_4$, respectively represent weights applied to the hit rate score, the program error priority score, the test time score, and the feature-level program error distribution score.

In an example, the relationship among $\omega_1$, $\omega_2$, $\omega_3$, and $\omega_4$ may be set to $\omega_1 > \omega_2 > \omega_3 > \omega_4$. In this way, the sorted priorities of the hit rate, the program error priority, the test time, and the feature-level program error distribution may be further presented as follows: hit rate>program error priority>test time>feature-level program error distribution. It should be understood that the example shown here is illustrative only, and there may be other relationships among $\omega_1$, $\omega_2$, $\omega_3$, and $\omega_4$.

Then, multiple test cases in the test case set in block 220 may be sorted based on the total score for the priority of the test cases. A higher total score of the priority of a test case represents a greater probability that the test case may be selected preferentially.

By the foregoing method, a test strategy may be provided. The test strategy may select test cases based on "existing records," so that the product testing is more accurate and comprehensive. Furthermore, the method has higher value in large system software (such as storage software).

Figure 3B:
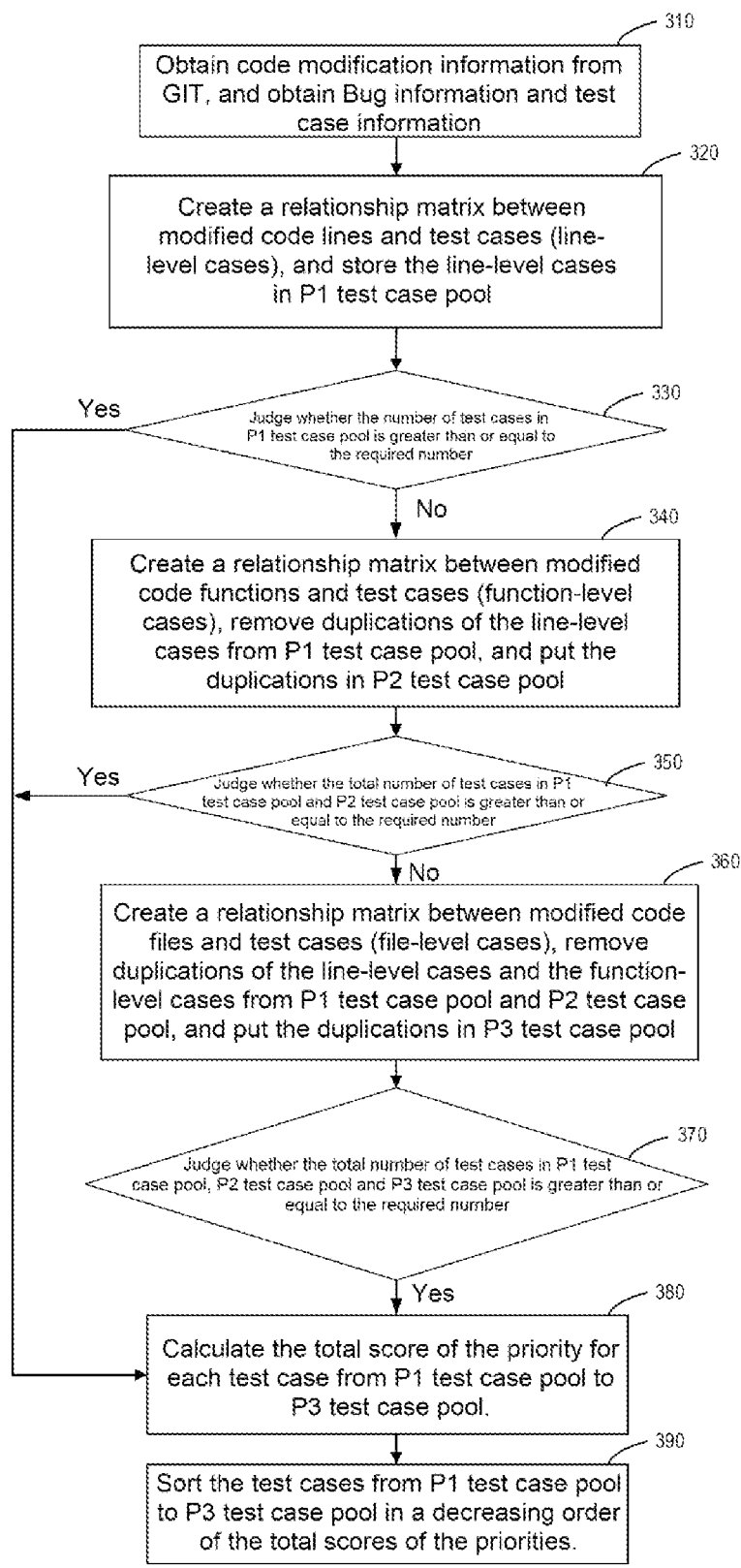
FIG. 3B shows a flow chart of an example method for testing according to some other embodiments of the present disclosure.

Embodiments of the present disclosure will be described below with reference to specific application scenes. As shown in FIG. 3B, in step 310, code modification information is obtained from GIT, and Bug information and test case information are obtained. For example, the obtained modification information may be $BFf = \{f_1, f_2 \ldots f_m\} =$

| | |
|---|---|
| $f_1$ | EstimateTotalBytesToBeTransferred |
| $f_2$ | EstimateTotalBytesToBeTransferredDone, |
| $f_3$ | GetMidLevelBitmapDone |
| $f_4$ | ChangeStatus |
| $f_5$ | cyc_os_spinlock_lock, |
| $f_6$ | GenerateCurrentSGL |
| $f_7$ | ProcessBitmapBasedSGLCopyCompletion |
| $f_8$ | ProcessBitmapBasedSGLCopyCompletion |
| $f_9$ | SendStartBulkCopyMsg |
| $f_{10}$ | SendBulkCopyCompletedMsg |
| $f_{11}$ | SendBulkCopyCompletedMsgCallback |
| $f_{12}$ | ProcessStartBulkCopyMsg |
| $f_{13}$ | SetRestartAddress |
| $f_{14}$ | IsStartRangedCopyRequest |
| $f_{15}$ | QueryCopyStatus |
| $f_{16}$ | PrepareAndSendEvent |
| $f_{17}$ | PrepareEventMetaData |
| $f_{18}$ | SendCopierIo |
| $f_{19}$ | DPEventQueueObjectRecord |
| $f_{20}$ | StopCopy |
| $f_{21}$ | CopyEndEventSentCallback |
| $f_{22}$ | GetBitmapForSGLIntermediateCallback |
| $f_{23}$ | InitiateCopyCompletion |

-continued

| | |
|---|---|
| $f_{24}$ | GetCopierBitmap |
| $f_{25}$ | SendCancelBulkCopyMsg |
| $f_{26}$ | MessageHandlerWithObject |
| $f_{27}$ | ProcessIo |
| $f_{28}$ | DM_read |
| $f_{29}$ | DM_write, |
| $f_{30}$ | RequestQoSTokens |
| $f_{31}$ | InitiateCopyCancellation |
| $f_{32}$ | RequestCopierCompletion |
| $f_{33}$ | UpdateCopierMetricsData, |
| $f_{34}$ | DisplayMetrics |

In step 320, a relationship matrix is created between modified code lines and test cases (line-level cases), and the line-level cases are stored in P1 test case pool. For example, by performing this step, Bug sets that update $f_j$ may be shown as follows:

$$d(f_1) = \{d_{11}, d_{123}\} = \{mdt63784, mdt58574\}$$

$$d(f_3) = \{d_{13}, d_{23}, d_{33}\} = \{mdt94481, mdt92936, mdt95365\}$$

$$d(f_4) = d(f_5) = \{d_{14}, d_{24}\} = \{mdt95022, mdt97323\}$$

$$d(f_6) = \{d_{14}, d_{24}, d_{123}, d_{134}, d_{234}, d_{334}, d_{434},\} =$$
$$\left\{ \begin{array}{l} mdt95022, mdt97323, mdt58574, mdt90643, \\ mdt97121, mdt98872, mdt99332 \end{array} \right\}$$

$$d(f_{27}) = d(f_{28}) = d(f_{29}) = d(f_{30}) = \{d_{127}\} = \{mdt141295\}$$

In step 330, whether the number of test cases in P1 test case pool is greater than or equal to the required number is judged. If the judgment in step 330 is no, step 340 is performed. If the judgment in step 330 is yes, step 380 is performed. For example, by performing this step, updated associated test case sets shown as follows may be obtained:

$$t(d(f_1)) = \{QC47829\_Async\_Replication; QC48111\_vol\_migration\_basic\}$$

$$t(d(f_3)) = \left\{ \begin{array}{l} QC47829\_Async\_Replication; \\ QC43321\_Multiple\_deleting\_volumes\_clones; \end{array} \right\}$$

$$t(d(f_4)) = t(d(f_5)) = \left\{ \begin{array}{l} QC42255\_Async\_Replication\_AG\_Remap; \\ QC49881\_Async\_Replication\_snap\_largconfig \end{array} \right\}$$

$$t(d(f_6)) = \left\{ \begin{array}{l} QC42255\_Async\_Replication\_AG\_Remap; \\ QC49881\_Async\_Replication\_snap\_largconfig \\ QC48111\_vol\_migration\_basic; \\ QC51151\_Snap\_Diff\_verification; \\ QC533233\_Replicate\_VNX\_PS \\ QC49881\_Async\_Replication\_snap\_largconfig; \\ QC42331\_Replication\_data\_Fresh\_install\_appliance \end{array} \right\}$$

$$t(d(f_{27})) = t(d(f_{28})) = t(d(f_{29})) = t(d(f_{30})) =$$
$$\{QC48113\_vol\_migration\_cutover\}$$

In step 340, a relationship matrix is created between modified code functions and test cases (function-level cases), and duplications of the line-level cases are removed from P1 test case pool and put in P2 test case pool. For example, by performing this step, a relationship matrix ccM (part) shown in FIG. 3C may be obtained. Due to space constraints, FIG. 3C is shown in three parts.

For $f_3$ GetMidLevelBitmapDone, the parent Bug involves three duplicate Bugs, two of which are reported by the same test case, so $\delta_{ij}$ should be de-duplicated and then recorded only once.

For $f_9$ SendBulkCopyCompletedMsg, the same test case reports two different Bugs which are not duplicate, so the Bugs are counted twice. Test case QC49881 is similar to $f_6$.

Based on the foregoing matrix, if function SendBulkCopyCompletedMsg is updated again and only one test case $$SC(t_i) = \omega_1 * r_i^{f_6} + \omega_2 * p_i^{f_6} + \omega_3 * T_i^{f_6} + \omega_4 * C_i^{f_6} ([\omega_1, \omega_2, \omega_3, \omega_4] = [0.5, 0.3, 0.1, 0.1])$$

| ID | Test name | Bug | P | $ps(t_i)$ | Time | $r_i^{f_6}$ | $p_i^{f_6}$ | $T_i^{f_6}$ | $SC(t_i)$ |
|---|---|---|---|---|---|---|---|---|---|
| $t_1$ | QC-42255_Async_Replication_AG_Remap | MDT-95022 | p00 | 4 | 5 h | $r_1^{f_6} = \frac{1}{7}$ | $p_1^{f_6} = \frac{4}{18}$ | $T_1^{f_6} = 0.3$ | 0.268 |
| $t_2$ | QC-49881_Async_Replication_snap_largconfig | MDT-97323 MDT-99332 | p00 p01 | 4 | 6 h | $r_2^{f_6} = \frac{2}{7}$ | $p_2^{f_6} = \frac{4}{18}$ | $T_2^{f_6} = 0.25$ | 0.3345 |
| $t_3$ | QC-42331_Replication_data_Fresh_install_appliance | MDT-90643 | p01 | 2 | 3 h | $r_3^{f_6} = \frac{1}{7}$ | $p_3^{f_6} = \frac{2}{18}$ | $T_3^{f_6} = 0.5$ | 0.2547 |
| $t_4$ | QC-51151_Snap_Dif_verification | MDT-97121 | p01 | 2 | 5 h | $r_4^{f_6} = \frac{1}{7}$ | $p_4^{f_6} = \frac{2}{18}$ | $T_4^{f_6} = 0.3$ | 0.2347 |
| $t_5$ | QC-533233_Replicate_VNX_PS | MDT-98872 | p01 | 2 | 15 h | $r_5^{f_6} = \frac{1}{7}$ | $p_5^{f_6} = \frac{2}{18}$ | $T_5^{f_6} = 0.1$ | 0.2147 |
| $t_6$ | QC-48111_vol_migration_basic | MDT-58574 | p00 | 4 | 10 h | $r_6^{f_6} = \frac{1}{7}$ | $p_6^{f_6} = \frac{4}{18}$ | $T_6^{f_6} = 0.15$ | 0.2530 | is needed for verification due to time limit, it is possible to select test case QC-488892_vvol_migration_Scale to verify the function. Associated cases sorted are:

1. QC-488892_vvol_migration_Scale
2. QC-49881_Async_Replication_snap_basicConfig However, if a newly updated function is GenerateCurrentSGL and three test cases are required for verification, the other four test cases are not easy to sort, and more factors may need to be introduced.

In step 350, whether the total number of test cases in P1 test case pool and P2 test case pool is greater than or equal to the required number is judged. If the judgment in step 350 is no, step 360 is performed. If the judgment in step 350 is yes, step 380 is performed. For example, for six test cases associated with $f_6$, the following factors may be calculated for each test case:

regression factor $$r_i^{f_6} = \frac{\delta_{i6}}{\sum_{i=1}^{6} \delta_{i6}} = \frac{\delta_{i6}}{7}$$

priority factor $$ps(t_i) = \max\{ps(d_{i6})\} p_i^{f_6} = \frac{ps(t_i)}{\sum_{i=1}^{6} ps(t_i)} = \frac{ps(t_i)}{18}$$

time factor $$T_i^{f_6} = \frac{\max\{T(t_1) \ldots \ldots T(t_6)\}}{T(t_i)} * 0.1 = \frac{15}{T(t_i)} * 0.1$$

Based on the foregoing three factors and assuming that $C_i^{f_6}=1$, the total score for each test case may be obtained:

In step 360, a relationship matrix is created between modified code files and test cases (file-level cases), and duplications of the line-level cases and the function-level cases are removed from P1 test case pool and P2 test case pool and put in P3 test case pool.

In step 370, whether the total number of test cases in P1 test case pool, P2 test case pool, and P3 test case pool is greater than or equal to the required number is judged. If the judgment in step 370 is no, the process ends. If the judgment in step 370 is yes, step 380 is performed.

In step 380, the total score of the priority for each test case from P1 test case pool to P3 test case pool is calculated.

In step 390, the test cases from P1 test case pool to P3 test case pool are sorted in a decreasing order of the total scores of the priorities. By performing this step, the sorted foregoing six test cases are: $t_2, t_1, t_3, t_6, t_4, t_5$. If file and module level search is needed, the same sorting method is used.

FIG. 4 shows a schematic block diagram of example device 400 that may be used for implementing embodiments of the present disclosure. For example, the method 200 shown in FIG. 2 may be implemented by device 400. As shown in FIG. 4, device 400 includes central processing unit (CPU) 401 which may perform various appropriate actions and processing according to computer program instructions stored in read-only memory (ROM) 402 or computer program instructions loaded from storage unit 408 to random access memory (RAM) 403. RAM 403 may further store various programs and data required by operations of device 400. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disc; and communication unit 409, such as a network card, a modem, or a wireless communication transceiver. Communication unit 409 allows device 400 to exchange information/data with other devices through a computer network such as the Internet and/or various telecommunication networks.

The various processes and processing described above, for example, method 200, may be executed by CPU 401. For example, in some embodiments, method 200 may be implemented as a computer software program that is tangibly included in a machine-readable medium such as storage unit 408. In some embodiments, part of or all the computer program may be loaded and/or installed onto device 400 via ROM 402 and/or communication unit 409. When the computer programs are loaded to RAM 403 and executed by CPU 401, one or more actions of method 200 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operations of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technical improvements, so as to enable persons of ordinary skill in the art to understand the embodiments disclosed herein.

What is claimed is:

1. A method for testing, comprising:
obtaining code modification information, program error information and test case information in respective first, second and third data structures of a processor-based computing system, the code modification information of the first data structure comprising code modification records performed for program errors in the program error information of the second data structure, and the test case information comprising test cases of the third data structure made for the program errors, the code modification records comprising at least first code modification records of a first type at a first hierarchical level of code modifications and second code modification records of a second type, different than the first type, at a second hierarchical level of code modifications;
selecting, by processing of at least portions of the first, second and third data structures in the processor-based computing system, a first test case set associated with the code modification records from the test case information according to the program error information, the first test case set being selected based on at least one additional data structure configured by the processor-based computing system to characterize mapping relationships between particular ones of the first and second code modification records of the first data structure and particular ones of the test cases of the third data structure;
sorting, in the processor-based computing system, multiple test cases in the first test case set to generate a test strategy for the code modification records; and
initiating execution of at least a portion of the generated test strategy in the processor-based computing system.

2. The method according to claim 1, wherein selecting a first test case set associated with the code modification records from the test case information comprises:
determining a second test case set having mapping relationships with the code modification records from the test case information according to mapping relationships between the code modification records and the program errors and mapping relationships between the program errors and the test cases; and
de-duplicating the test cases in the second test case set to obtain the first test case set.

3. The method according to claim 2, wherein the code modification records comprise function-level code modification records, and the first test case set comprises function-level test cases having mapping relationships with the function-level code modification records.

4. The method according to claim 3, wherein the code modification records further comprise file-level code modification records, and the first test case set further comprises file-level test cases having mapping relationships with the file-level code modification records.

5. The method according to claim 4, wherein the code modification records further comprise module-level code modification records, and the first test case set further comprises module-level test cases having mapping relationships with the module-level code modification records.

6. The method according to claim 1, wherein sorting multiple test cases in the first test case set comprises:
for each test case in the first test case set, determining a hit rate score, a program error priority score and a test time score respectively;
obtaining a total score for indicating the priority of each test case in the first test case set based on the hit rate score, the program error priority score and the test time score; and
sorting multiple test cases in the first test case set based on the total scores.

7. The method according to claim 6, wherein determining the hit rate score comprises:
for each test case in the first test case set, determining a number of associated program errors that will be fixed according to the code modification records; and
obtaining the hit rate score corresponding to each test case in the first test case set based on a proportion of the number of the associated program errors corresponding to each test case in the first test case set to a total number of the associated program errors corresponding to all test cases in the first test case set.

8. The method according to claim 7, wherein determining the program error priority score comprises:
obtaining priority values of the associated program errors corresponding to each test case in the first test case set; and
obtaining the program error priority score corresponding to each test case in the first test case set based on a ratio of the priority values of the associated program errors corresponding to each test case in the first test case set to the sum of the priority values of the associated program errors corresponding to all test cases in the first test case set.

9. The method according to claim 8, wherein determining the test time score comprises:
obtaining an execution time duration of each test case in the first test case set; and
obtaining the test time score corresponding to each test case in the first test case set based on a ratio of a reference time duration to the execution time duration of each test case in the first test case set.

10. The method according to claim 6, wherein sorting multiple test cases in the first test case set further comprises:
for each test case in the first test case set, obtaining a feature-level program error distribution score; and
wherein the total score is obtained based on the hit rate score, the program error priority score, the test time score and the feature-level program error distribution score.

11. The method according to claim 10, wherein obtaining the feature-level program error distribution score comprises:

obtaining a number of program errors mapped to each test case in the first test case set across features and a number of the features; and obtaining the feature-level program error distribution score corresponding to each test case in the first test case set based on the number of program errors mapped to each test case in the first test case set across features and the number of the features.

12. An electronic device, comprising:

at least one processor; and at least one memory storing computer program instructions, wherein the computer program instructions, when executed by the at least one processor, cause the electronic device to perform actions comprising:

obtaining code modification information, program error information and test case information in respective first, second and third data structures of a processor-based computing system, the code modification information of the first data structure comprising code modification records performed for program errors in the program error information of the second data structure, and the test case information comprising test cases of the third data structure made for the program errors, the code modification records comprising at least first code modification records of a first type at a first hierarchical level of code modifications and second code modification records of a second type, different than the first type, at a second hierarchical level of code modifications;

selecting, by processing of at least portions of the first, second and third data structures in the processor-based computing system, a first test case set associated with the code modification records from the test case information according to the program error information, the first test case set being selected based on at least one additional data structure configured by the processor-based computing system to characterize mapping relationships between particular ones of the first and second code modification records of the first data structure and particular ones of the test cases of the third data structure;

sorting, in the processor-based computing system, multiple test cases in the first test case set to generate a test strategy for the code modification records; and initiating execution of at least a portion of the generated test strategy in the processor-based computing system.

13. The electronic device according to claim 12, wherein selecting a first test case set associated with the code modification records from the test case information comprises:

determining a second test case set having mapping relationships with the code modification records from the test case information according to mapping relationships between the code modification records and the program errors and mapping relationships between the program errors and the test cases; and de-duplicating the test cases in the second test case set to obtain the first test case set.

14. The electronic device according to claim 12, wherein sorting multiple test cases in the first test case set comprises:

for each test case in the first test case set, determining a hit rate score, a program error priority score and a test time score respectively;

obtaining a total score for indicating the priority of each test case in the first test case set based on the hit rate score, the program error priority score and the test time score; and sorting multiple test cases in the first test case set based on the total scores.

15. The electronic device according to claim 14, wherein determining the hit rate score comprises:

for each test case in the first test case set, determining a number of associated program errors that will be fixed according to the code modification records; and obtaining the hit rate score corresponding to each test case in the first test case set based on a proportion of the number of the associated program errors corresponding to each test case in the first test case set to a total number of the associated program errors corresponding to all test cases in the first test case set.

16. The electronic device according to claim 15, wherein determining the program error priority score comprises:

obtaining priority values of the associated program errors corresponding to each test case in the first test case set; and obtaining the program error priority score corresponding to each test case in the first test case set based on a ratio of the priority values of the associated program errors corresponding to each test case in the first test case set to the sum of the priority values of the associated program errors corresponding to all test cases in the first test case set.

17. The electronic device according to claim 16, wherein determining the test time score comprises:

obtaining an execution time duration of each test case in the first test case set; and obtaining the test time score corresponding to each test case in the first test case set based on a ratio of a reference time duration to the execution time duration of each test case in the first test case set.

18. The electronic device according to claim 14, wherein sorting multiple test cases in the first test case set further comprises: for each test case in the first test case set, obtaining a feature-level program error distribution score; and wherein the total score is obtained based on the hit rate score, the program error priority score, the test time score and the feature-level program error distribution score.

19. The electronic device according to claim 18, wherein obtaining the feature-level program error distribution score comprises:

obtaining a number of program errors mapped to each test case in the first test case set across features and a number of the features; and obtaining the feature-level program error distribution score corresponding to each test case in the first test case set based on the number of program errors mapped to each test case in the first test case set across features and the number of the features.

20. A computer program product tangibly stored on a non-transitory computer-readable medium and comprising machine-executable instructions, wherein the machine-executable instructions, when executed by a device, cause the device to perform actions comprising:

obtaining code modification information, program error information and test case information in respective first, second and third data structures of a processor-based computing system, the code modification information of the first data structure comprising code modification records performed for program errors in the program error information of the second data structure, and the test case information comprising test cases of the third data structure made for the program errors, the code modification records comprising at least first code modification records of a first type at a first hierarchical level of code modifications and second code modification records of a second type, different than the first type, at a second hierarchical level of code modifications;

selecting, by processing of at least portions of the first, second and third data structures in the processor-based computing system, a first test case set associated with the code modification records from the test case information according to the program error information, the first test case set being selected based on at least one additional data structure configured by the processor-based computing system to characterize mapping relationships between particular ones of the first and second code modification records of the first data structure and particular ones of the test cases of the third data structure;

sorting, in the processor-based computing system, multiple test cases in the first test case set to generate a test strategy for the code modification records; and initiating execution of at least a portion of the generated test strategy in the processor-based computing system.

\* \* \* \* \*